W. A. McWATTY & A. A. SINCLAIR.
BRAKE RATCHET SHIELD FOR RAILWAY CARS.
APPLICATION FILED JUNE 26, 1909.
950,266.
Patented Feb. 22, 1910.
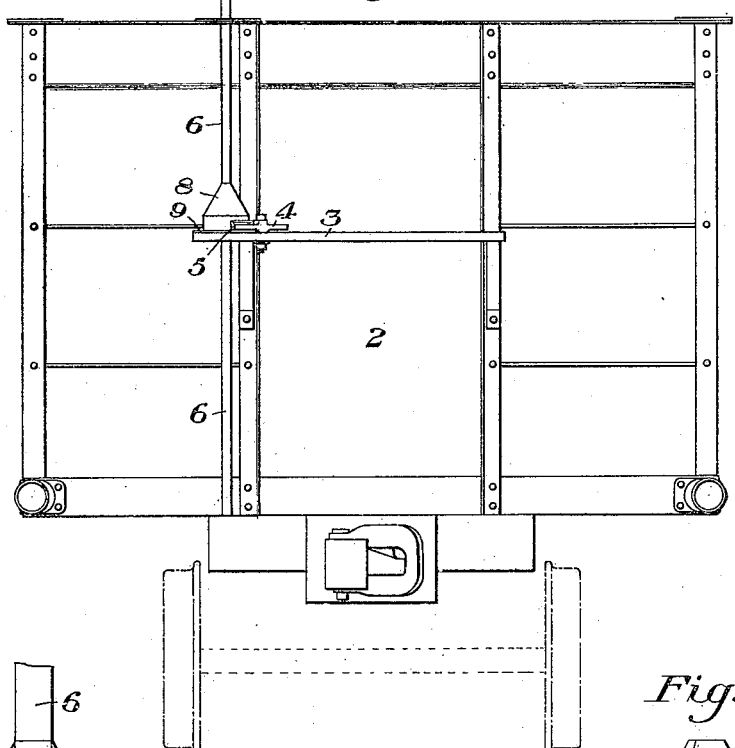
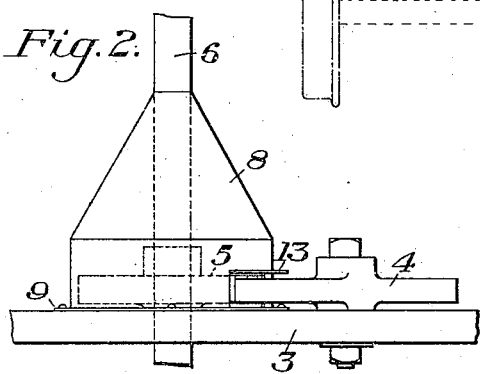
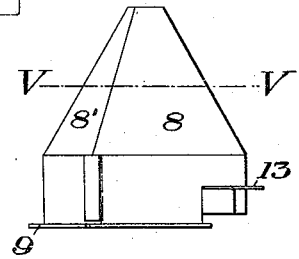
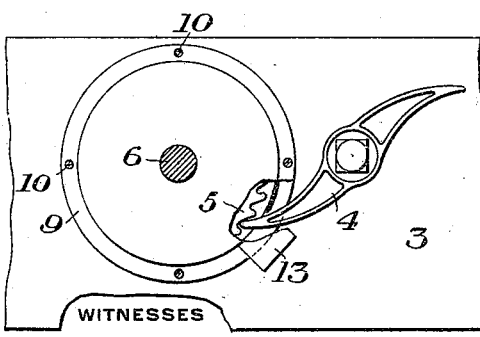
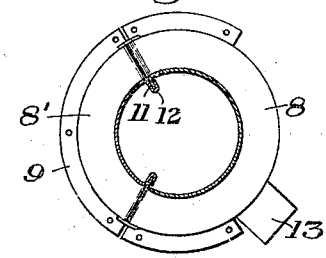
INVENTORS

UNITED STATES PATENT OFFICE.

WILLIAM A. McWATTY, OF PROCTOR, MINNESOTA, AND ALFRED A. SINCLAIR, OF SUPERIOR, WISCONSIN.

BRAKE-RATCHET SHIELD FOR RAILWAY-CARS.

950,266.  Specification of Letters Patent.  Patented Feb. 22, 1910.

Application filed June 26, 1909. Serial No. 504,547.

*To all whom it may concern:*

Be it known that we, WILLIAM A. McWATTY, of Proctor, St. Louis county, Minnesota, and ALFRED A. SINCLAIR, of Superior, Douglas county, Wisconsin, have invented a new and useful Brake-Ratchet Shield for Railway-Cars, of which the following is a full, clear, and exact description, reference being had to the accompanying drawings, forming part of this specification, in which—

Figure 1 is an end elevation of a steel hopper car having a hand brake, and having the ratchet wheel and pawl of the brake equipped with a shield constructed and arranged in accordance with our invention; Fig. 2 is a detail side elevation showing the brake staff ratchet wheel and pawl and showing our improved shield in place on the foot board or platform of the car; Fig. 3 is a plan view of the brake shown in Fig. 2; Fig. 4 is a detail elevation of the shield forming our invention; Fig. 5 is a sectional plan on the line V—V of Fig. 4, showing the preferred manner in which the detachable parts are assembled together in forming our improved shield.

Our invention relates to the construction of hand brakes used on railway cars, and the object of the invention is to provide improved means for protecting the ratchet wheel and pawl forming the locking mechanism of such brakes, and means whereby the brake is made operative at all times. Heretofore the brake ratchet mechanism of such cars has been uncovered and exposed, and in loading cars, the ratchet wheel and pawl were covered with the materials loaded into the car. When covered with the materials in this manner, especially when the materials are soft, the ratchet mechanism is rendered inoperative until after the coal or other materials are removed from around the brake locking mechanism. The materials when moist or wet become packed and hardened so as to prevent setting of the brake, and, in cold weather become frozen, which makes the pawl movement difficult, if not impossible.

Our invention is designed to lessen and prevent this difficulty and to provide means whereby the brake locking mechanism is always in an operative condition and by which it can be set at any time; and delays occasioned by the necessity of moving materials covering the locking mechanisms are overcome and prevented.

In the drawings, 2 represents the end of a steel hopper car having a foot board or platform 3 on which the pawl 4 and ratchet wheel 5 comprising the locking mechanism of the hand brake are mounted. The wheel 5 is secured on the staff 6 of the brake, this staff having the usual hand wheel 7 by which the brake is operated by the brakeman.

Surrounding the ratchet wheel 5 is a conical shield 8, the shield tapering upwardly and inwardly and terminating at its lower edge in an annular flange 9 by which it is secured in place on the foot board 3 of the car by means of screws 10. Preferably the shield is made in two parts, 8, 8' which have their edges bent so as to form tongues 11 and grooves 12 which engage with each other to slide the parts in place in assembling the shield around the staff 6 and ratchet wheel 5 of the brake. The side of the shield 8 is provided with an opening through which one end of the pawl 4 projects so as to permit of its engagement with the teeth in the ratchet wheel 5 and the shield is provided with an outwardly extending lip 13 which covers the end of the ratchet pawl 4 projecting into engagement with the teeth of the ratchet wheel.

The advantages of our invention are many and will be appreciated by those skilled in the art. The apparatus is simple and is easily applied for use both on new cars and on existing cars when secured in place on the foot board of the car, the shield provides effective covering for the lock mechanism in moving the materials through.

The shape of the shield is such that any materials dropping on the shield during the car loading.operations will be deflected from the platform, and the accumulation of ore or other materials around the brake locking mechanism is rendered impossible.

Modifications in the construction and arrangement of the parts may be made without departing from our invention. The manner of securing the shield in place may be changed. The means employed for securing the parts of the shield together may be modified and other changes may be made.

We claim:—

1. In a hand brake for railway cars, brake locking mechanism on the brake staff, a segmental shield covering said locking mechanism means for securing the segments together in assembled relation and means for securing said shield in place around said locking mechanism; substantially as described.

2. In a hand brake for railway cars, locking mechanism on the brake staff, a segmental shield covering said locking mechanism and means for securing said shield in place, said shield having interlocking edge portions arranged to secure the segments together; substantially as described.

3. In a hand brake for railway cars having locking mechanism on the brake staff, a conical segmental shield covering said locking mechanism and means for securing said shield in place, said shield having interlocking edge portions arranged to secure the segments together; substantially as described.

4. In a hand brake for railway cars having locking mechanism on the brake staff, a conical shield formed in segments and covering said locking mechanism integral means formed on the segments for securing the segments together and means for securing said shield in place around the brake staff; substantially as described.

5. In a hand brake for railway cars, having a ratchet and pawl locking mechanism on the brake staff, a conical shield incasing said ratchet wheel, an opening through the side of said shield through which the pawl extends and an outwardly turned lip on the shield extending over said opening; substantially as described.

6. In a hand brake for railway cars, having a ratchet and pawl locking mechanism on the brake staff, a segmental conical shield incasing said ratchet wheel, an opening through the side of said shield through which the pawl extends and an outwardly turned lip on the shield above said opening, the segments of said shield having interlocking edge portions arranged to secure the parts together; substantially as described.

In testimony whereof, we have hereunto set our hands.

WILLIAM A. McWATTY.
ALFRED A. SINCLAIR.

Witnesses as to William A. McWatty:
  W. A. McGonagle,
  C. G. Carlson.

Witnesses as to Alfred A. Sinclair:
  W. B. Kellogg,
  Mabel Beese.